United States Patent [19]
Sell

[11] 3,955,112
[45] May 4, 1976

[54] HERMETICALLY SEALED ROTOR

[76] Inventor: Otto W. Sell, 2201 E. Ash St., Deming, N. Mex. 88030

[22] Filed: Jan. 24, 1975

[21] Appl. No.: 543,872

[52] U.S. Cl. .............................. 310/86; 310/68 E; 335/205; 417/902
[51] Int. Cl.² .......................................... H02K 5/10
[58] Field of Search .................. 310/41, 57, 46, 48, 310/66, 68, 68 B, 68 E, 74, 75, 75 A, 86, 87, 157, 88, 89; 335/205, 207; 200/80, 80 B; 318/330; 416/50–53; 417/279; 74/336.5; 73/518

[56] References Cited
UNITED STATES PATENTS

| 1,142,866 | 6/1915 | Wilson | 310/68 B |
|---|---|---|---|
| 2,266,037 | 12/1941 | Henninger | 310/46 |
| 2,310,761 | 2/1943 | Daiger | 310/86 |
| 2,473,839 | 6/1949 | Altfather | 318/330 |
| 2,492,435 | 12/1949 | Ostline | 310/46 |
| 2,911,549 | 11/1959 | Culk | 310/86 |
| 2,925,041 | 2/1960 | Sigmund | 310/86 |
| 3,790,730 | 10/1972 | Wyland | 310/68 E |

*Primary Examiner*—R. Skudy
*Attorney, Agent, or Firm*—Victor J. Evans & Co.

[57] ABSTRACT

A hermetically sealed rotor as would form a component of either a single phase or a three phase electric motor. The rotor is positioned in close proximity to a conventional state of winding but is completely in hermetically sealed copper casing. A plurality of L-shaped pivotally mounted arms on the rotor swing outward to open a starting switch when the rotor picks up speed.

3 Claims, 4 Drawing Figures

HERMETICALLY SEALED ROTOR

BACKGROUND OF THE INVENTION

1. Field of the Invention

The present invention relates to rotors forming a standard component of an electric motor.

SUMMARY OF THE INVENTION

The present invention of a hermetically sealed rotor forms a component of a conventional either single phase or three phase electric motor, the rotor being incased in a copper shell and positioned to rotate freely within this copper shell when it is placed in proximity to a stator winding. Since the copper shell offers no electrical resistance to magnetic lines of force there is adequate linkage between the rotor and the field from the stator and thus the rotor turns freely within its copper casing. Also enclosed within the copper shell are pivoted L-shaped iron weights which centrifugally swing outward and near the copper casing when the rotor is spinning. Positioned outside of the copper shell there is a double leafed starting switch. One leaf of which supports a U-shaped magnet which is attracted to the iron arms within the casing to move towards these arms and therefore open the electrical contacts on the other arms of the starting switch. Connected to one end of the rotor shaft there may be any desired device which may be driven by an electric motor and in this case there is shown a fluid pump.

The primary object of the invention is to provide a hermetically sealed rotor, as may be used in an electric motor, which operates at full efficiency but without the deterrent of dirt, grease, and etc.

Other objects and advantages will become apparent in the following specification when considered in light of the attached drawings.

DESCRIPTION OF THE PREFERRED EMBODIMENT

Figure 1:
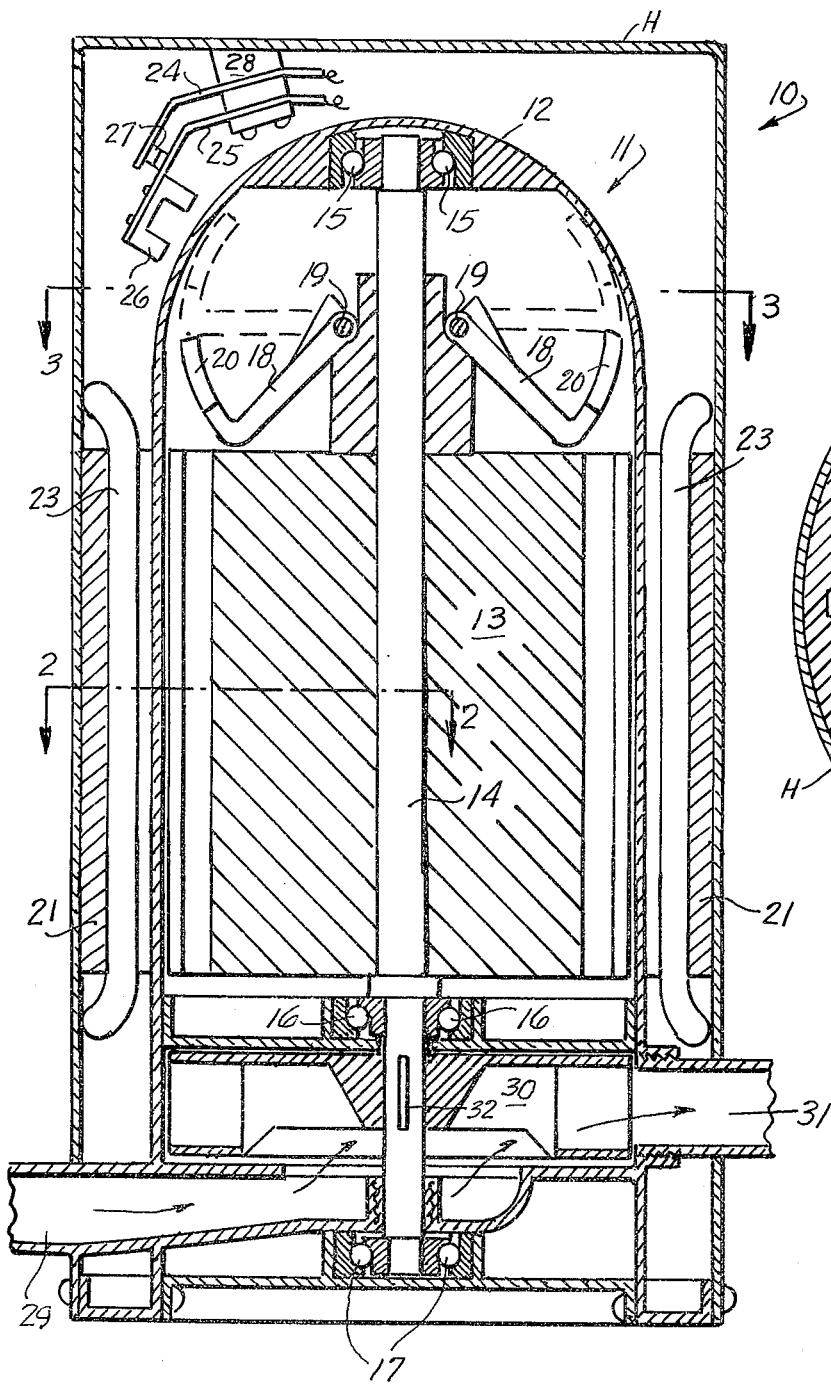
FIG. 1 is a sectional view showing the invention with the rotor at rest.
Figure 2:
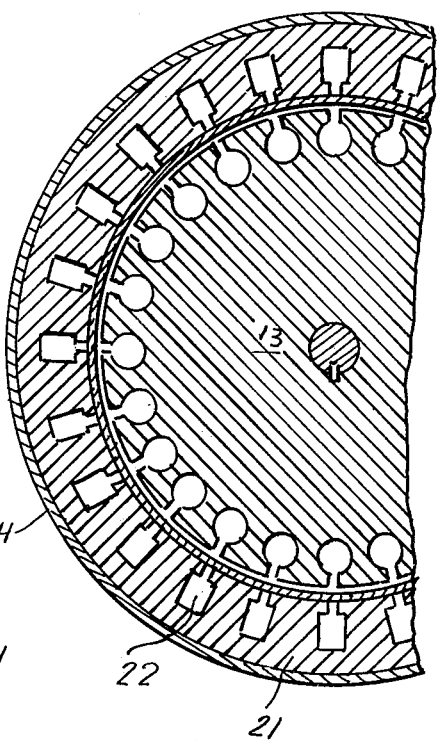
FIG. 2 is a view taken along the line 2—2 of FIG. 1 showing the winding slots in both the rotor and the stator.
Figure 3:
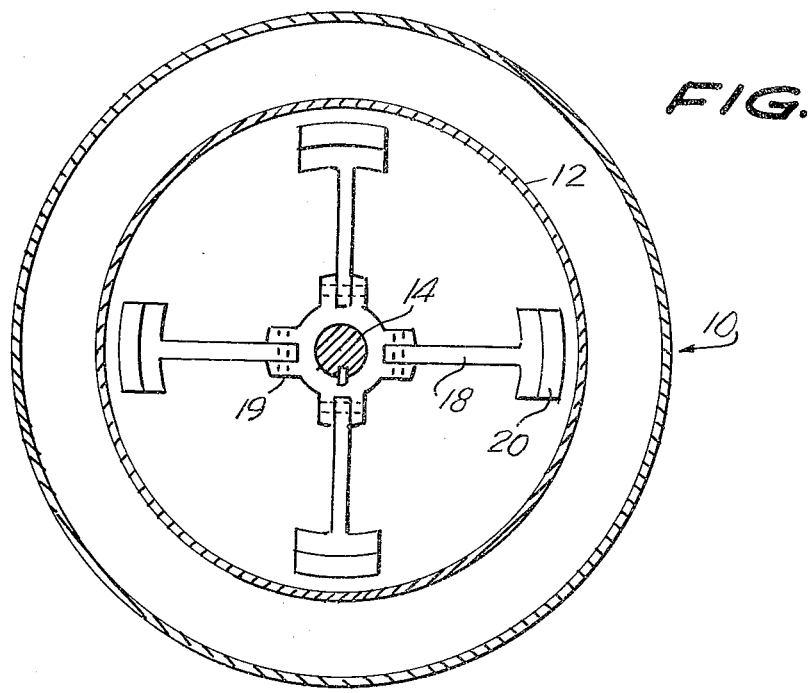
FIG. 3 is a plan view taken along the line 3—3 of FIG. 1.
Figure 4:
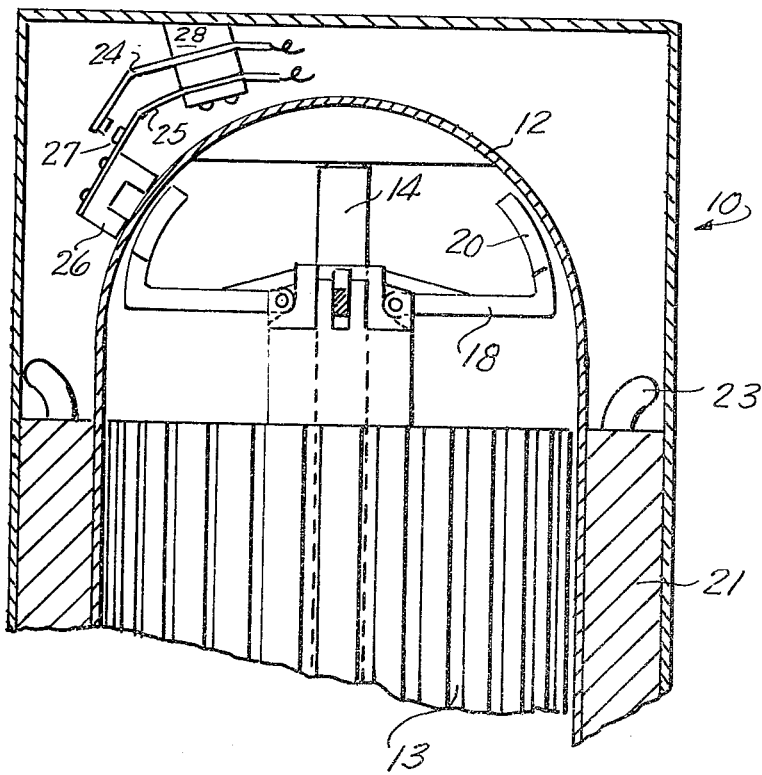
FIG. 4 is a sectional view showing the starting switch in operation.

Referring now to the drawings in detail, wherein like reference characters indicate like parts throughout the several figures, the reference numeral 10 indicates generally an electric motor encorporating a hermetically sealed rotor indicated generally at 11.

The hermetically sealed rotor 11 includes a one piece copper shell 12 which completely encloses the rotor winding and a portion of the starter switch, the shell being substantially dome shaped and completely sealed at the bottom. The rotor winding 13 are within the copper shell and are located around a central axle, or shaft 14, the shaft 14 being mounted for easy rotation by bearings 15 at one end and also bearings 16 at a lower portion. The lower most portion of the shaft 15 also has another set of bearings 17 which will be described more fully here-in-after.

At the upper portion of the rotor there is positioned four equally spaced arms 18 which are pivoted at points 19 so that they will swing out into a horizontal position by centrifugal force when the rotor is turning, the extended position being shown by the dotted lines. Arms 18 are substantially L-shaped in configuration, there being an iron weight 20 attached to the outer part of the L-shaped arm. It may be noted in FIG. 1 that when the arms 18 are in their extended position that the portion of the arm where the iron weights are attached comes in very close proximity to the inner wall of the copper shell 12.

A stator core 21 surrounds the rotor 13 and is attached to a housing H surrounding the electric motor 10, the stator having a plurality of slots 22 positioned therein to receive the stator winding 23. When stator windings 23 are energized a magnetic turning moment is imparted to the rotor 13 thereby causing it to rotate according to standard electronic processes.

An electrical switch shown generally as 28 is located outside of the copper shield 12 supported on the housing H and within the confines of the motor 10 generally. The switch 28 has two leaf springs 24 and 25 spaced essentially parallel to each other while spring 25 has attached to its end a U-shaped permanent magnet 26 and electrical contacts 27 are substantially mounted between the two leaf springs 24 and 25. Starting switch 28 is connected to a series of starting windings (not shown). Since FIG. 1 shows the motor in a energized position the pivoted arms 18 are in a downward location and starting switch 28 has its electrical contacts 27 together. When potential is applied to the motor and the rotor 13 starts to turn by centrifugal force the arms 18 are pivoted into their dotted position and the iron weights 20 come in close proximity to the permanent magnet 26. Since the copper shell 12 does not block electro-magnetic forces when the iron comes near permanent magnet 26 the magnet is attracted to the iron bending leaf arm 25 and thereby opening electrical contacts 27. When contacts 27 open this cuts off the starting windings allows the rotor 13 to continue turning under the influence of its running windings. When potential is removed from the motor the arms 18 move down back in place away from magnet 26 and therefore leaf arms 24 and 25 of the switch will again close.

In the lower portion of FIG. 1 the electric motor 10 is shown as driving a pump and here the pump is attached to the rotor shaft 14 by means of a key 32. Fluid enters by means of the pump entrance 29 passes through the impeller blades 30 and through the output 31.

In the use and operation of the invention an electric motor rotor 13 is entirely surrounded by a hermetically sealed copper shield 12 which protects the rotor from dirt, oil and etc., while at the same time not diminishing efficient operation. Included within the copper shield 12 there are a plurality of pivoted arms 18 which swing out into a horizontal position when the rotor is turning and because of their close approximate position to permanent magnet 26 of the starting switch 28 the switch is attracted to the arm weights on the arms 18 to open starting switch contact 27 and thereby cut off the starting windings. Rotor bearings 15 and 16 are also within the copper shield and are therefore protected from contaminates. The starting switch 28 is on the outside of shield 12 and thereby prevents burning of lubricate and is a cheaper construction then a starting relay, although with the use of a three phase motor a starting switch may be omitted entirely.

Having thus described the preferred embodiment of the invention it should be understood that numerous structural modifications and adaptations may be resorted to without departing from the spirit of the invention.

What is claimed is:

1. A rotor in combination with a stator to form an electric motor comprising a core, windings in the core, a shaft through said core for rotatably mounting said core, a copper shield completely surrounding and hermetically sealing the core, a plurality of L-shaped arms pivotally attached at their ends to the core so that they swing outward toward the copper shield when the rotor is turning.

2. The device of claim 1 wherein the arms have an iron portion on the transverse section of the L-shaped arm.

3. The device of claim 2 further including a housing surrounding said motor, a starting switch having two leaf spring arms and mounted on said housing outside of the copper shield and in proximity to the pivoted arms, electrical contacts on each arm to complete an electrical circuit when the contacts touch, and a magnet on one arm whereby said magnet is attracted to the iron portion of said pivoted arms when said arms swing outward to thereby open the electrical contacts of said starting switch.

* * * * *